(12) United States Patent
An et al.

(10) Patent No.: US 10,866,299 B2
(45) Date of Patent: Dec. 15, 2020

(54) METHOD AND APPARATUS FOR DETERMINING AZIMUTH FOR TRANSMISSION BY BASE STATION

(71) Applicant: Samsung Electronics Co., Ltd., Suwon-si (KR)

(72) Inventors: Chanho An, Suwon-si (KR); Gracjan Kwiatkowski, Cracow (PL); Grzegorz Zajac, Belchatow (PL); Szymon Stefanski, Cracow (PL); Hongkyu Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/578,687

(22) Filed: Sep. 23, 2019

(65) Prior Publication Data

US 2020/0096596 A1    Mar. 26, 2020

(30) Foreign Application Priority Data

Sep. 21, 2018 (KR) ........................ 10-2018-0114295

(51) Int. Cl.
*G01S 3/40* (2006.01)
*H04W 16/28* (2009.01)
(Continued)

(52) U.S. Cl.
CPC .............. *G01S 3/40* (2013.01); *H04B 17/318* (2015.01); *H04W 16/28* (2013.01); *H04W 84/042* (2013.01); *H04W 88/08* (2013.01)

(58) Field of Classification Search
CPC ......... G01S 3/40; H04B 17/318; H04W 16/28
See application file for complete search history.

(56) References Cited

U.S. PATENT DOCUMENTS 7,809,505 B2    10/2010 Lee et al.
2005/0032531 A1*   2/2005 Gong ........................ G01S 3/28
455/456.5
(Continued)

FOREIGN PATENT DOCUMENTS

EP    2876918 A1    5/2015
JP    2010-093520 A    4/2010
(Continued)

OTHER PUBLICATIONS

Search Report dated Dec. 26, 2019, issued in an International Application No. PCT/KR2019/012363.
(Continued)

*Primary Examiner* — Muthuswamy G Manoharan
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method and an apparatus for determining an azimuth for transmission by a base station based on information received from a terminal are provided. The method includes receiving per-terminal location information and per-terminal received signal strength information from a plurality of terminal, sampling terminals located in coverage of the base station based on the per-terminal location information and per-
(Continued)

terminal received signal strength information, and determining the azimuth for transmission by the base station based on a result of the sampling.

16 Claims, 11 Drawing Sheets

(51) Int. Cl.
*H04B 17/318* (2015.01)
*H04W 84/04* (2009.01)
*H04W 88/08* (2009.01)

(56) References Cited

U.S. PATENT DOCUMENTS

| | | | |
|---|---|---|---|
| 2009/0061921 A1 | 3/2009 | Eom et al. | |
| 2009/0312037 A1* | 12/2009 | Jo | G01S 5/08 455/456.2 |
| 2011/0130135 A1* | 6/2011 | Trigui | H04W 24/08 455/423 |
| 2011/0176525 A1 | 7/2011 | Park et al. | |
| 2013/0009821 A1 | 1/2013 | Steer et al. | |
| 2013/0217413 A1 | 8/2013 | Sanders et al. | |
| 2013/0273921 A1* | 10/2013 | Kenington | H04W 16/18 455/446 |
| 2014/0297213 A1 | 10/2014 | Lee | |
| 2014/0315577 A1 | 10/2014 | Yokoyama | |
| 2019/0268779 A1* | 8/2019 | Peroulas | H04W 16/22 |

FOREIGN PATENT DOCUMENTS

| | | |
|---|---|---|
| KR | 10-2005-0101952 A | 10/2005 |
| KR | 10-0653081 B1 | 11/2006 |
| KR | 10-2011-0085274 A | 7/2011 |
| KR | 10-2014-0117120 A | 10/2014 |

OTHER PUBLICATIONS

3GPP TS 37.320 V15.0.0, '3GPP; TSG RAN; UTRAN and E-UTRA; Radio measurement collection for Minimization of Drive Tests (MDT); Overall description; Stage 2 (Release 15)', Jul. 6, 2018, See sections 5.1.1.1, 5.1.4.

* cited by examiner

METHOD AND APPARATUS FOR DETERMINING AZIMUTH FOR TRANSMISSION BY BASE STATION

CROSS-REFERENCE TO RELATED APPLICATION(S)

This application is based on and claims priority under 35 U.S.C. § 119(a) of a Korean patent application number 10-2018-0114295, filed on Sep. 21, 2018, in the Korean Intellectual Property Office, the disclosure of which is incorporated by reference herein in its entirety.

BACKGROUND

1. Field

The disclosure relates to a method and apparatus for determining an azimuth for transmission by a base station based on information received from a terminal.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The disclosure provides a method for determining an azimuth of an antenna module of a base station in a next generation mobile communication system known as the $5^{th}$ generation (5G) communication system. The disclosure also provides a method for judging whether a base station equipped with an antenna module is normally operating based on the determined azimuth of the antenna module.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for determining an azimuth for transmission by a base station based on information received from a terminal.

Additional aspects will be set forth in part in the description which follows and, in part, will be apparent from the description, or may be learned by practice of the presented embodiments.

In accordance with an aspect of the disclosure, a method for determining an azimuth for transmission by a base station in a wireless communication system is provided. The method includes receiving per-terminal location information and per-terminal received signal strength information from a plurality of terminals, sampling terminals located in a coverage area of the base station based on the per-terminal location information and per-terminal received signal strength information, and determining the azimuth for transmission by the base station based on a result of the sampling.

In accordance with another aspect of the disclosure, a base station of a wireless communication system is provided. The base station includes at least one antenna module configured to transmit and receive signals to and from terminals and a at least one processor configured to control the at least one antenna module to receive per-terminal location information and per-terminal received signal strength information from a plurality of terminal, sample the terminals located in a coverage area of the base station based on the per-terminal location information and per-terminal received signal strength information, and determine the azimuth of the at least one antenna module based on a result of the sampling.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
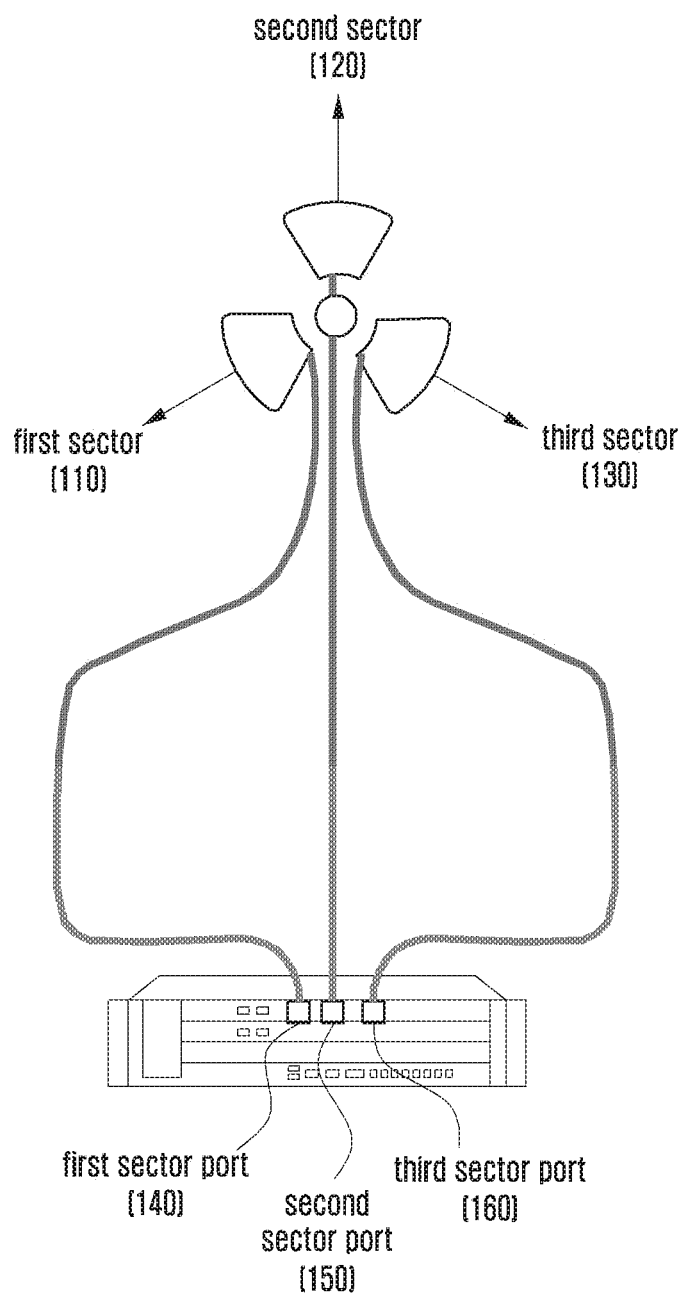
FIGS. 1A, 1B, and 1C are diagrams illustrating configurations of antenna modules installed in a base station according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of various embodiments and the accompanying drawings. The disclosure may, however, be embodied in many different forms and should not be construed as being limited to the various embodiments set forth herein; rather, these various embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more central processing units (CPUs) in a device or a secure multimedia card.

FIG. 1A is a diagram for explaining a normal configuration of antenna modules equipped in a base station according to an embodiment of the disclosure.

Referring to FIG. 1A, first, second, and third antenna modules may be arranged in the base station so as to form a first sector 110, a second sector 120, and a third sector 130, respectively. According to an embodiment, the first sector 110 may be a region formed with an azimuth of 210° as a predetermined reference point, the second sector 120 may be a region formed with an azimuth of 90° as a predetermined reference point, and the third sector 130 may be a region formed with an azimuth of 330° as a predetermined reference point, in coverage area of the base station.

Referring to FIG. 1A, the first antenna module configured to form the first sector 110 may be electrically connected to a first sector port 140 of an electronic device, the second antenna module configured to form the second sector 120 may be electrically connected to a second sector port 150 of the electronic device, and the third antenna module configured to form the third sector 130 may be electrically connected to a third sector port 160 of the electronic device.

According to an embodiment, the electronic device may be installed in the base station or in a separate server outside the base station. According to an embodiment, the electronic device may determine an azimuth of each of the first to the third antenna modules, which are respectively configured to form the first to third sectors 110, 120, and 130, based on an electric signal received from each of the first to third sector ports 140, 150, and 160.

Figure 1B:
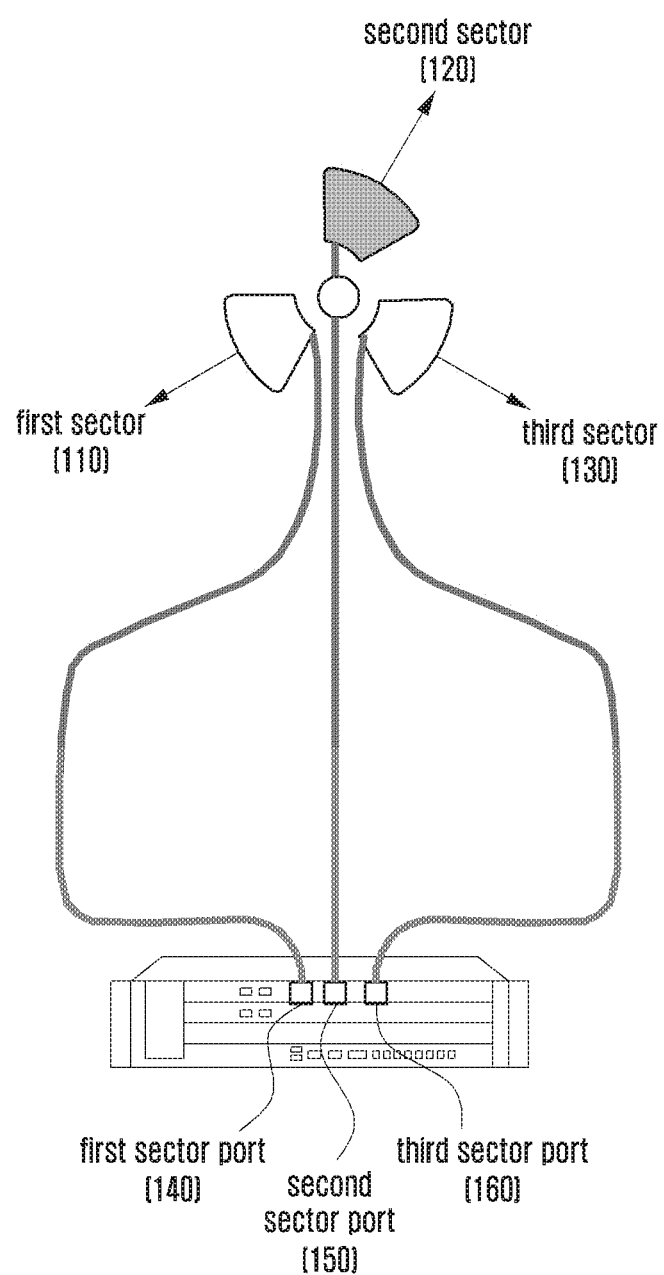

FIG. 1B is a diagram for explaining a configuration of antennal modules equipped in a base station according to an embodiment of the disclosure.

Referring to FIG. 1B, the first, second, and third antenna modules may be arranged in the base station so as to form a first sector 110, a second sector 120, and a third sector 130, respectively. According to an embodiment, the first sector 110 may be a region formed with an azimuth of 210° as a predetermined reference point, the second sector 120 may be a region formed with an azimuth of 40° as a predetermined reference point, and the third sector 130 may be a region formed with an azimuth of 330° as a predetermined reference point, in coverage area of the base station.

In the configuration according to the embodiment of FIG. 1B, the region corresponding to the second sector may differ from that in the embodiment of FIG. 1A. For example, if there is no necessity of radio communication in a region formed between azimuths 80° and 190° as reference points, it is not necessary to assign an antenna module for the region formed between azimuths 80° and 190° and, as a result, the base station may include the antenna modules arranged as shown in FIG. 1B.

Referring to FIG. 1B, the first antenna module configured to form the first sector 110 may be electrically connected to the first sector port 140 of the electronic device, the second antenna module configured to form the second sector 120 may be electrically connected to a second sector port 150 of the electronic device, and the third antenna module configured to form the third sector 130 may be electrically connected to a third sector port 160 of the electronic device.

According to an embodiment, the azimuths of the antenna modules of the base station that are stored in a database of an operator may not match the azimuths of antenna modules that are shown in FIG. 1B. For example, although the second sector is a region formed with an azimuth of 40° as a predetermined reference point, it may be registered as a region formed with an azimuth of 90° as a predetermined reference point in the database, for the aforementioned reason.

According to an embodiment, the difference between the real azimuth of an antenna module and the azimuth registered of the antenna module that is stored in the database may result from an error made by an engineer in measuring an azimuth of the antenna module initially after the installation of the base station or storing the measured azimuth of the antenna module in the database.

Figure 1C:
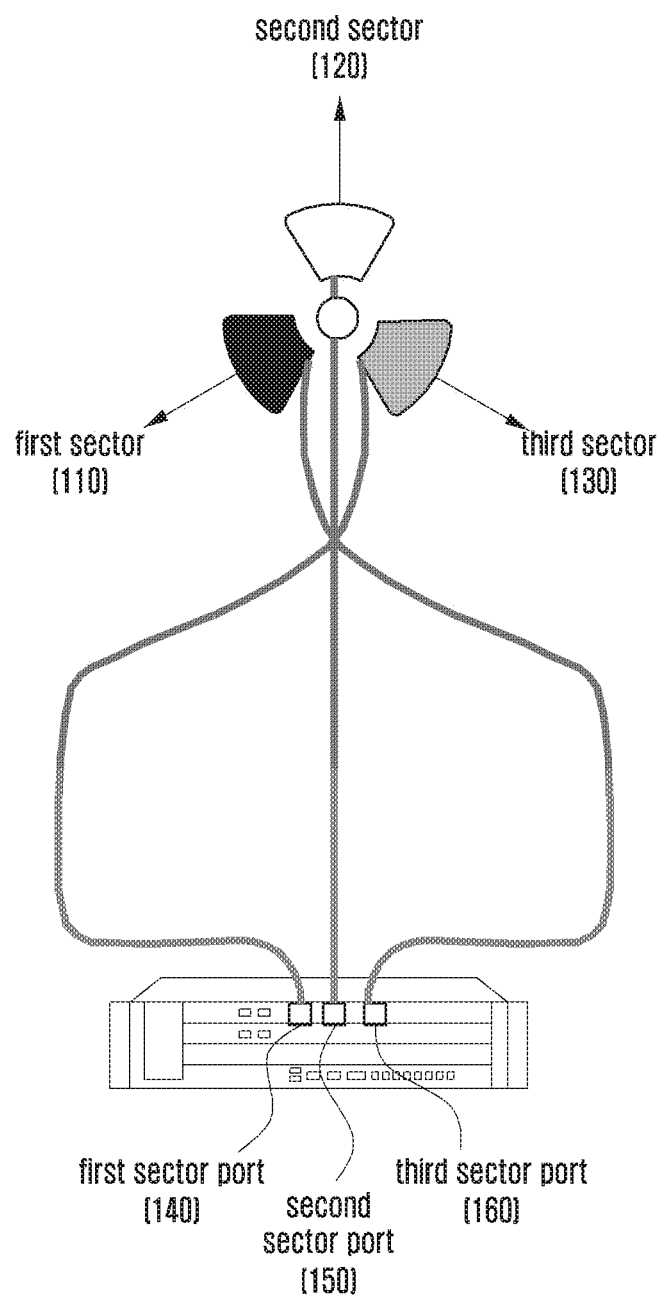

FIG. 1C is a diagram for explaining a configuration of antenna modules equipped in a base station according to an embodiment of the disclosure.

Referring to FIG. 1C, the first, second, and third antenna modules may be arranged in the base station so as to form a first sector 110, a second sector 120, and a third sector 130, respectively. According to an embodiment, the first sector 110 may be a region formed with an azimuth of 210° as a predetermined reference point, the second sector 120 may be a region formed with an azimuth of 90° as a predetermined reference point, and the third sector 130 may be a region formed with an azimuth of 330° as a predetermined reference point, in coverage area of the base station.

Referring to FIG. 1C, the first antenna module configured to form the first sector 110 may be electrically connected to a third sector port 160 of an electronic device, the second antenna module configured to form the second sector 120 may be electrically connected to a second sector port 150 of the electronic device, and the third antenna module configured to form the third sector 130 may be electrically connected to a first sector port 140 of the electronic device.

Although the false connections, i.e., connection of the antenna module for the first sector 110 to the third sector port 160 and connection of the antenna module for the third sector 130 to the first sector port 140, are not shown externally, the first antenna module for the first sector 110 and the third antenna module for the third sector 130 may operate in an opposite manner.

Figure 2:
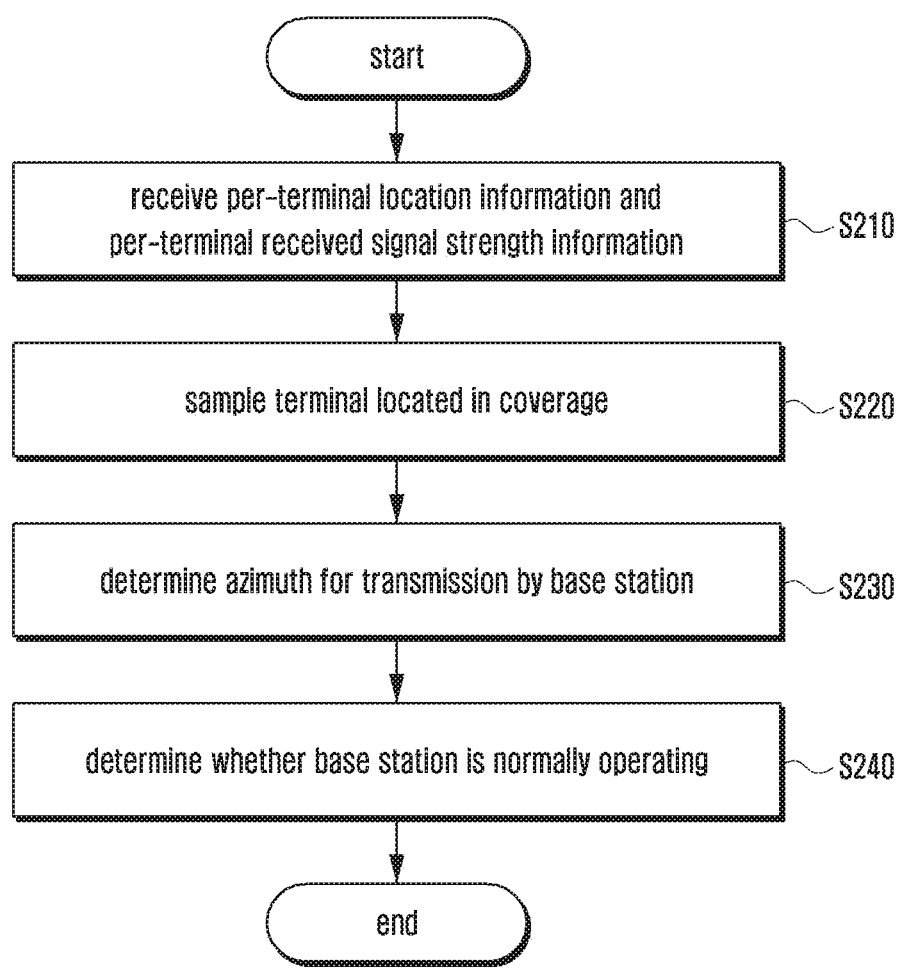
FIG. 2 is a flowchart illustrating a method for determining an azimuth for transmission by a base station according to an embodiment of the disclosure.

FIG. 2 is a flowchart illustrating a method for determining an azimuth for transmission by a base station according to an embodiment of the disclosure.

Referring to FIG. 2, according to an embodiment, the base station may receive per-terminal location information and received signal strength information from multiple terminals at operation S210. According to an embodiment, the per-terminal received signal strength information may be information on a reference signal received power (RSRP) or a radio frequency (RF) electric field measured by each terminal.

According to an embodiment, the operation of S210 may be performed in interoperation with a location information server of an operator such as a location-based service (LBS) server or by using a minimization of drive test (MDT) function. According to a disclosed embodiment, the LBS interoperation or MDT function-based per-terminal location information and received signal information acquisition method may be implemented with a protocol and configuration disclosed in the standard.

In an embodiment, the terminal may receive a global navigation satellite system (GNSS) signal from a satellite and exchange terminal location information estimated based on the GNSS signal with a server configured to store the terminal location information according to a basic long term evolution (LTE) positioning protocol (LPP) configuration described in the 3GPP standard document TS 36.355. That is, according to the LPP configuration described in the 3GPP standard document TS 36.355, a base station may receive terminal location information from a terminal.

In an embodiment, the base station may receive per-terminal location information and received signal strength information from the terminal through the MDT configuration operation described in the 3GPP standard document TS 37.320. According to an embodiment, the base station may transmit a LoggedMeasurementConfiguration message to the terminal, and the terminal may transmit its location information to the base station in response to the LoggedMeasurementConfiguration message.

According to an embodiment, the operation S210 may be performed by an application installed in the terminal. A description is made of the method for receiving the per-terminal location information and received signal strength information via the application installed in the terminal later with reference to FIG. 3.

According to an embodiment, at operation S220, the base station may sample the UEs located in the coverage area of the base station based on the per-terminal location information and received signal strength information. The detailed operation of operation S220 is described later with reference to FIG. 4.

According to an embodiment, the base station may determine, at operation S230, an azimuth for transmission by the base station based on a sampling result. According to an embodiment, if the base station includes multiple antenna modules, the base station may determine antenna-specific azimuths for transmission by the base station based on the sampling result. The detailed operation of S230 is described later with reference to FIGS. 6A and 6B.

According to an embodiment, the base station may compare the azimuth determined at operation S230 with a reference azimuth for the base station that is stored in a database to determine, at operation S240, whether the base station is normally operating. According to an embodiment, the base station may compare the antenna module-specific azimuths determined at operation 230 with antenna module-specific reference azimuths that are stored in a database to determine whether each antenna module is normally operating. The detailed operation of S240 is described later with reference to FIG. 7.

Figure 3:
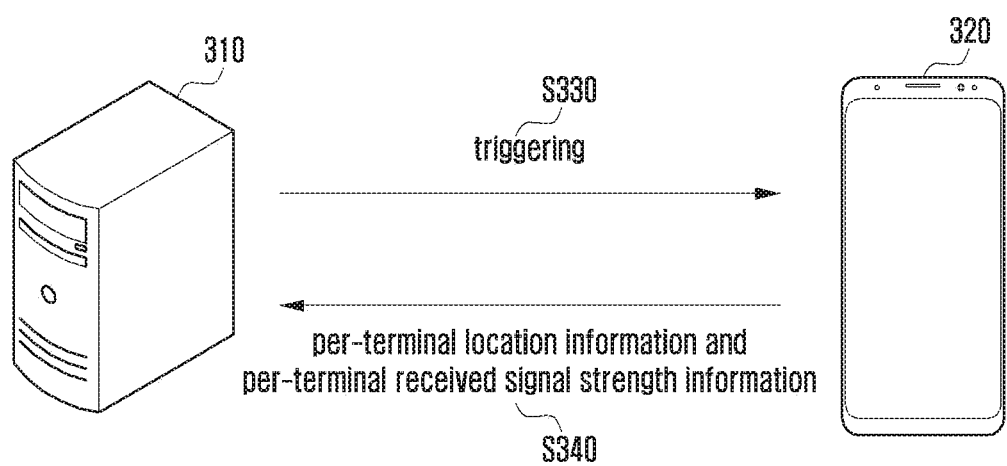
FIG. 3 is a diagram for explaining a method for acquiring per-terminal location information by means of an application installed in a terminal according to an embodiment of the disclosure.

FIG. 3 is a diagram for explain a method for acquiring per-terminal location information by means of an application installed in a terminal according to an embodiment of the disclosure.

Referring to FIG. 3, according to an embodiment, an operator server 310 may trigger, at operation S330, a terminal 320 to report its location to the operator server 310 by means of an operator server-related application. For example, if the operator server 310 pertains to navigation, it may trigger, at operation S330, the terminal 320 to report its location by means of a navigation application installed in the terminal 320.

According to an embodiment, the terminal location information report may be performed periodically. For example, while using a navigation service, the terminal 320 may transmit its location information to the operator server 310 at an interval of 1 ms for a real-time terminal location report.

According to an embodiment, the terminal location information report may be performed in an event-driven manner. For example, in the case where an application provided by the operator server 310 is executed in the terminal 320, if the received signal strength at the terminal is equal to or less than −120 dBm, the operator server 310 may trigger the terminal 320 to report its location.

According to an embodiment, the terminal 320 may transmit its location information and received signal strength information to the operator server 310 at operation S340. According to an embodiment, the terminal 320 may transmit only its location information at operation S340.

Although FIG. 3 is directed to a case where the operator server triggers the terminal to report only its location, it may also be possible for the base station to trigger the terminal to report its location and received signal strength at its location. That is, the scopes of the claims are not limited by the disclosed embodiment of FIG. 3.

Figure 4:
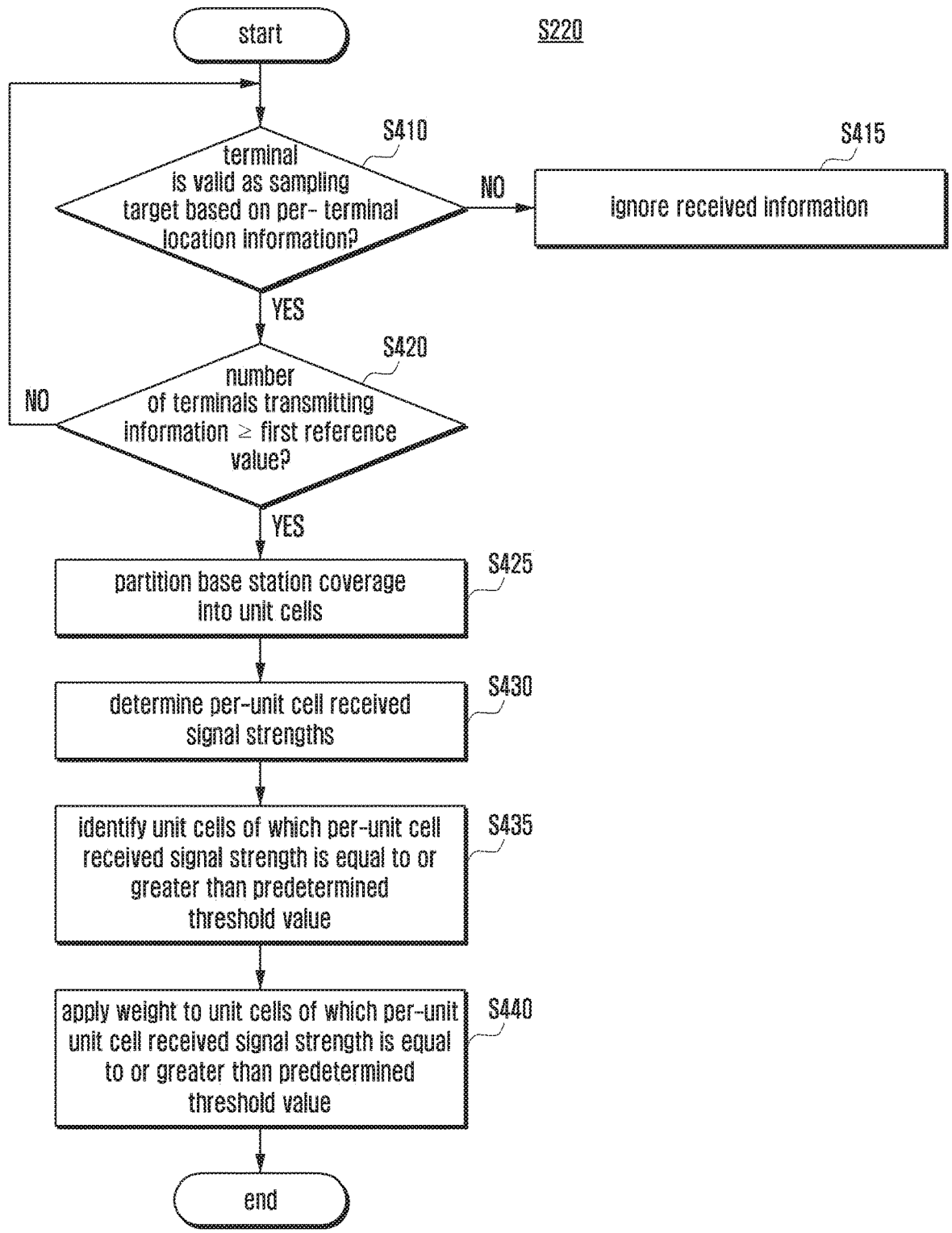
FIG. 4 is a flowchart illustrating a procedure of sampling terminals within a coverage area of a base station according to an embodiment of the disclosure.

FIG. 4 is a flowchart illustrating a procedure of sampling terminals within a coverage area of a base station according to an embodiment of the disclosure.

Referring to FIG. 4, according to an embodiment, the base station may determine at operation S410 whether a terminal is valid as a sampling target based on per-terminal location information transmitted by each terminal. For example, the base station may determine whether the terminal which transmits its location information is available as a sample for the sampling depending on whether the terminal is located within the coverage area of the base station, which is determined based on the location information transmitted by the terminal.

According to an embodiment, in the case where the base station includes three antenna modules as exemplified in FIGS. 1A to 1C, the base station may determine whether a terminal which transmits its location information is available as a sample for the sampling depending on whether the terminal is located within the first sector formed by the first antenna module, which is determined based on the terminal location information received by the first antenna module.

According to an embodiment, if it is determined at operation S410 that the terminal is invalid as a sample, the base station may ignore the received terminal location information at operation S415. For example, if it is determined that the terminal is located outside the coverage area of the base station based on the received terminal location information, the base station may determine that the terminal that transmits the location information is unavailable as a sample for the sampling and discard the location information.

According to an embodiment, if it is determined at operation S410 that the terminal is valid as a sample, the base station may determine at operation S420 whether a number of terminals transmitted per-terminal location information is equal to or greater than a first threshold value. According to an embodiment, the first threshold value may be a criterion of sampling accuracy. The sampling accuracy at the base station may be improved as the first threshold value increases because the number of terminals of which location information is received increases. Meanwhile, as the first threshold value decreases, the sampling time of the base station may decrease.

According to an embodiment, the base station may partition, at operation S425, its coverage into unit cells having a predetermined size based on the per-terminal location information. For example, the base station may partition its coverage into unit cells having a shape of a square of 5 m×5 m.

According to an embodiment, operation S425 may be omitted. That is, the base station may perform sampling based on per-terminal location-specific received signal strengths determined based on per-terminal location information received from each terminal without partitioning the coverage area of the base station into unit cells.

According to an embodiment, the base station may determine, at operation S430, a per-unit cell received signal strength based on per-terminal received signal strength information collected from the terminals located in each unit cell. According to an embodiment, the per-unit cell received signal strength may be an average of received signal strengths collected from the terminal located within a unit cell. For example, assuming a first unit cell with two terminals from which received signal strengths of −5 dB and −3 dB are respectively received and a second unit cell with three terminals from which received signal strengths of −10 dB, −3 dB, and −5 dB are respectively received, the received signal strengths for the first and second unit cells may become −4 dB and −6 dB, respectively.

According to an embodiment, the base station may identify, at operation S435, a unit cell for which the per-unit cell received signal strength is equal to or greater than a predetermine threshold value. For example, assuming the per-unit cell received signal strengths of −10 dB, −12 dB, and −30 dB that are respectively calculated for the first to third unit cells and a predetermined threshold value of −25 dB, the base station may identify the first and second unit cells as the unit cells of which per-unit cell received signal strengths are equal to or greater than the predetermined threshold value.

According to an embodiment, the base station may apply, at operation S440, a weight to the unit cells of which per-unit cell received signal strengths are equal to or greater than the predetermined threshold value. With reference to the above per-unit cell received signal strengths are equal to or greater than the predetermined threshold value. According to an embodiment, the weight is applied such that per-cell reliability is weighted in the sampling operation. For example, because an electric field of the base station is produced dominantly in a boresight direction of the base station, the base station may apply a weight to the unit cell formed with the strong electric field (i.e., unit cell of which per-unit cell received signal strength is equal to or greater than the predetermined threshold value). Meanwhile, operations S435 and S440 may be omitted. That is, the base station may perform the sampling operation without applying a weight to any unit cell.

Figure 5:
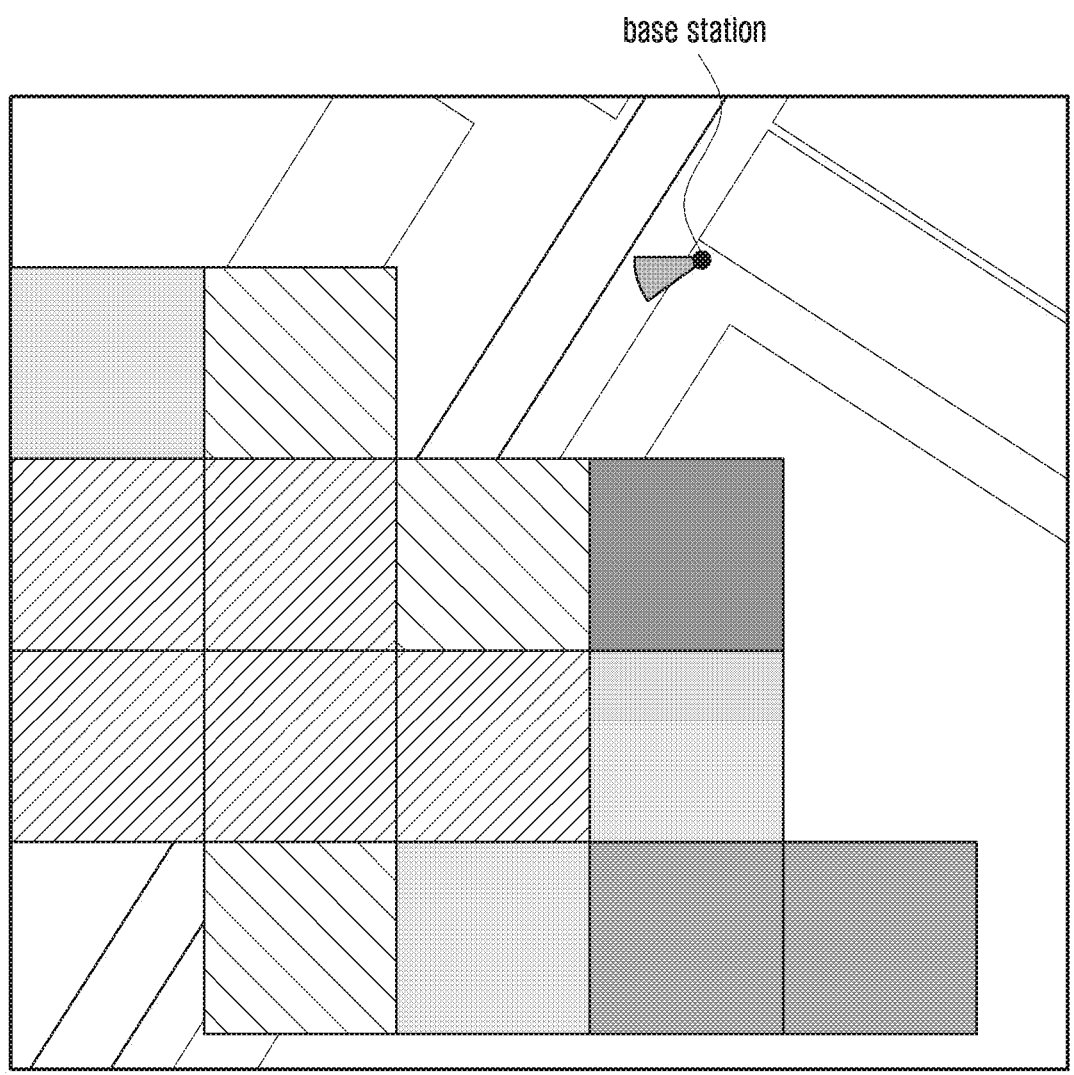
FIG. 5 is a diagram illustrating a coverage area of a base station that is acquired through sampling according to an embodiment of the disclosure.

FIG. 5 is a diagram illustrating a coverage area of a base station that is acquired through sampling according to a disclosed embodiment.

Referring to FIG. 5, according to an embodiment, the coverage area of the base station may include 14 unit cells, which are grouped into 4 regions according to the per-unit cell received signal strengths. According to an embodiment, the unit cells of which per-unit cell received signal strengths are equal to or greater than −70 dB may be grouped into a first region, the unit cells of which per-unit cell received signal strengths are equal to or greater than −75 dB and less than −70 dB may be grouped into a second region, the unit cells of which per-unit cell received signal strengths are equal to or greater than −80 dB and less than −75 may be grouped into a third region, and the unit cells of which per-unit cell received signal strengths are equal to or greater than −55 dB and less than −75 dB may be grouped into the fourth region.

According to an embodiment, the unit cells included in the first and second regions characterized by relatively strong received signal strengths may be considered to be placed in a region where the electric field of the base station is strongly produced, and the base station may apply a weight to the unit cells belonging to the first and second regions to improve the accuracy of determining an azimuth for transmission by the base station.

Figure 6A:
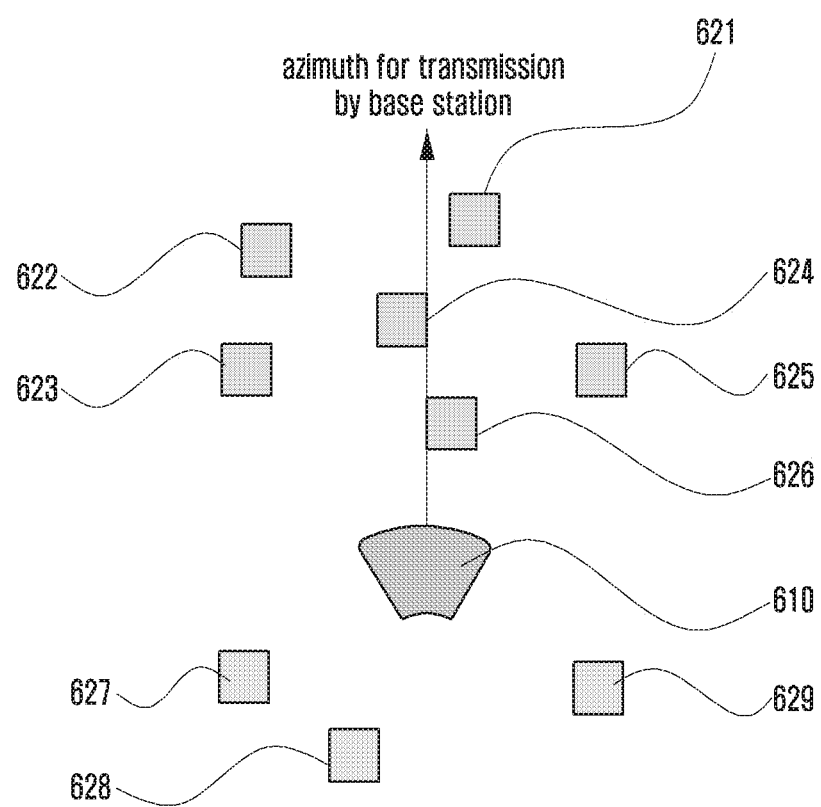
FIGS. 6A and 6B are diagrams for explaining a method for determining an azimuth for transmission by a base station according to various embodiments of the disclosure.
Figure 6B:
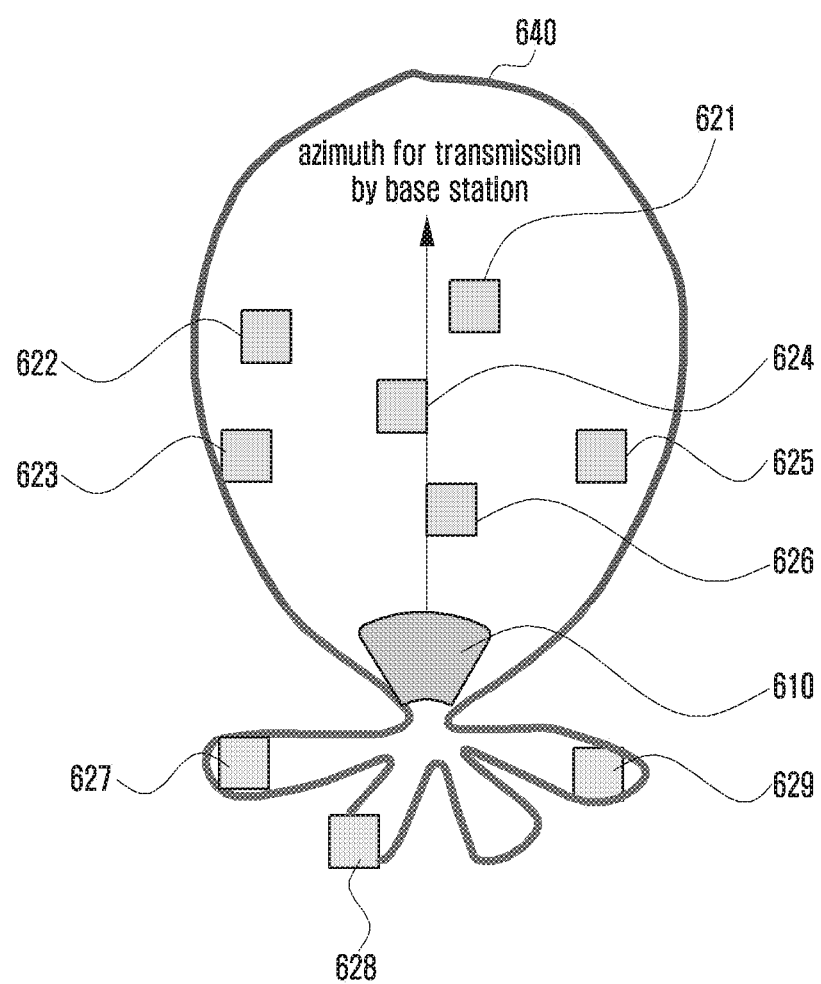

FIGS. 6A and 6B are diagrams for explaining a method for determining an azimuth for transmission by a base station according to various embodiments of the disclosure.

Referring to FIG. 6A, a coverage area of the base station (610) may include 9 unit cells 621, 622, 623, 624, 625, 626, 627, 628, and 629. According to an embodiment, the base station (610) may determine an azimuth for transmission by the base station (610) based on the azimuths directed to the respective unit cells 621, 622, 623, 624, 625, 626, 627, 628, and 629. For example, if the average of the azimuths directed to the respective unit cells is 67°, the base station (610) may set its azimuth for transmission to 67°.

According to an embodiment, the base station (610) may determine its azimuth for transmission by applying a weight to the respective unit cells. For example, if the unit cells 624 and 626 need to be weighted, the base station (610) may apply a weight to the unit cells 624 and 626 and calculate an average of the azimuths directed to the respective unit cells 621, 622, 623, 624, 625, 626, 627, 628, and 629 to determine its azimuth for transmission.

According to an embodiment, the base station (610) may determine its azimuth for transmission based on per-unit cell location information. According to an embodiment, the base station (610) may acquire the per-unit cell location information based on per-terminal location information transmitted by the terminal located in the respective unit cells and average the acquired per-unit cell location information to determine its azimuth for transmission. According to an embodiment, the base station (610) may determine its azimuth for transmission by applying a weight to the per-unit cell location information.

Referring to FIG. 6B, the base station (610) may determine its azimuth for transmission based on a correlation between its electric wave emission pattern 640 and per-unit cell received signal strengths in the unit cells 621, 622, 623, 624, 625, 626, 627, 628, and 629.

According to an embodiment, the base station (610) may measure the correlation between the electric wave emission pattern 640 and per-unit cell received signal strengths in the unit cells 621, 622, 623, 624, 625, 626, 627, 628, and 629 rotating the predetermined electric wave emission pattern 640 from 0° to 360°. According to an embodiment, the base station (610) may set its azimuth for transmission to a value of the azimuth of the electric wave emission pattern 640 having the highest correlation with the per-unit cell received signal strengths.

Figure 7:
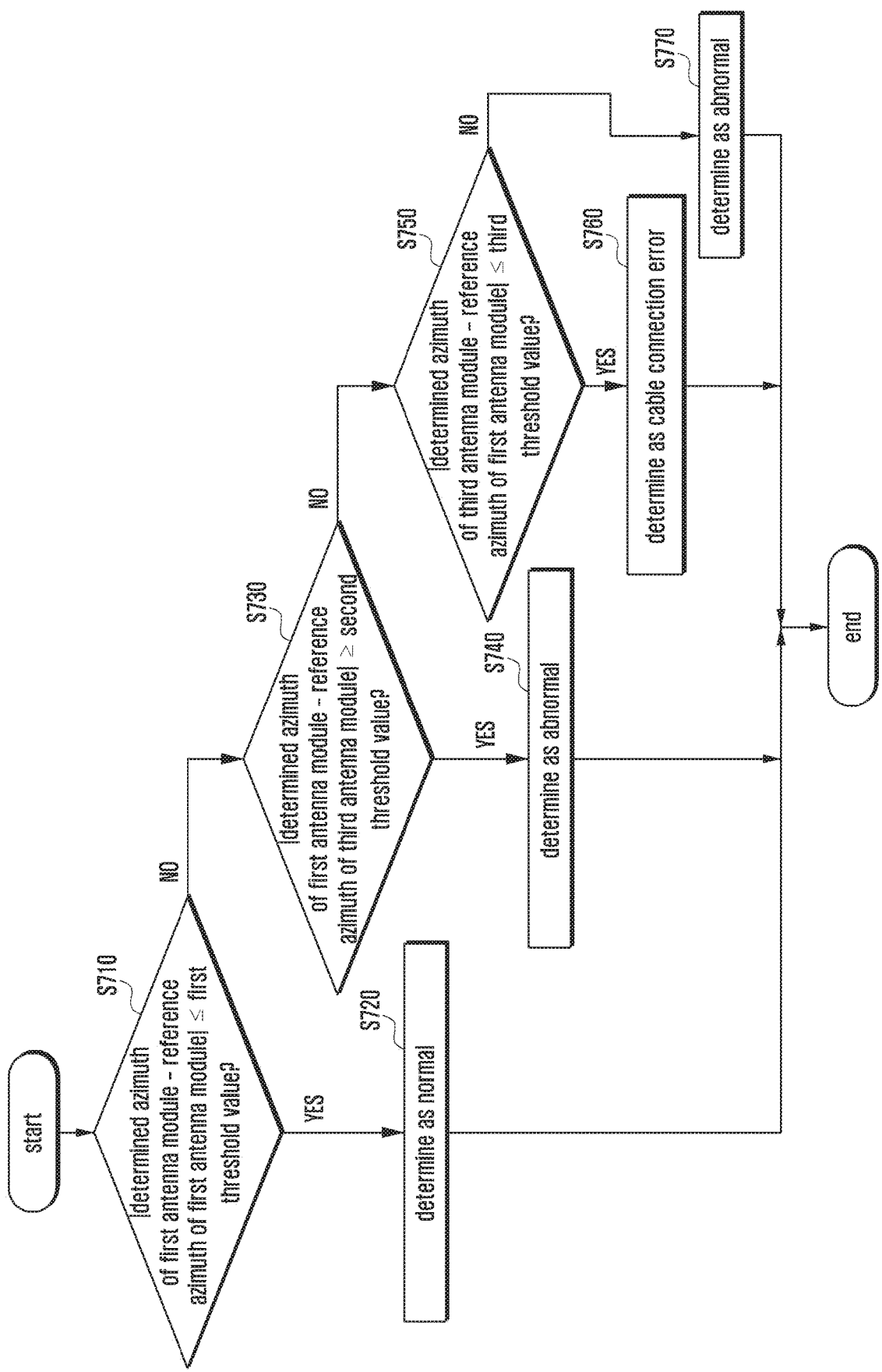
FIG. 7 is a flowchart illustrating a method for judging whether a base station is normally operating according to an embodiment of the disclosure.

FIG. 7 is a flowchart illustrating a method for judging whether a base station is normally operating according to an embodiment of the disclosure.

Referring to FIG. 7, according to an embodiment, the base station may include three antenna modules as disclosed in FIGS. 1A to 1C, and the antenna modules may be arranged to form respective sectors within the coverage area of the base station. For example, a first antenna module is arranged to form a first sector, a second antenna module is arranged to form a second sector, and a third antenna module is arranged to form a third sector.

According to an embodiment, the base station may partition each sector into unit cells based on per-terminal location information and received signal strength information received by means of the corresponding antenna module to perform sampling and may determine an azimuth for transmission by the corresponding antenna module based on a sampling result.

According to an embodiment, the base station may determine at operation S710 whether a difference between the determined azimuth of the first antenna module and a reference azimuth for the first antenna module is equal to or less than a predetermined first threshold value. According to an embodiment, the reference azimuth for the first antenna module may be a value stored in a database of the base station, which was set as the azimuth for the first antenna module when the base station was initially installed. According to an embodiment, the reference azimuth for the first antenna module may be determined by the area where the base station is installed (e.g., river, mountain, sea, and highway).

According to an embodiment, if it is determined that the difference between the determined azimuth of the first antenna module and the reference azimuth for the first antenna module is equal to or less than the predetermined first threshold value, the base station may judge at operation S720 that the first antenna module is normally operating. That is, if the difference between the current azimuth of the first antenna module and the azimuth of the first antenna module that was set when the base station was initially installed is not significant, the base station may determine that the first antenna module is normally operating. Meanwhile, if it is determined that the difference between the current azimuth of the first antenna module and the azimuth of the first antenna module that was set when the base station was initially installed is significant, i.e., greater than the first threshold value, the base station may judge that the first antenna module is abnormally operating. According to an embodiment, if the base station judges that the azimuth of the first antenna module is abnormal, it may notify an operator of the base station of the abnormality of the azimuth of the first antenna module. According to an embodiment, the operator may receive a report indicating normality/abnormality per antenna module so as to take appropriate action immediately upon detection of any abnormality in a per-antenna module azimuth.

According to an embodiment, the first threshold value may be determined based on a channel condition between the first antenna module and a terminal. For example, the first threshold value for the case where the channel condition between the first antenna module and the terminal is unstable may be greater than the first threshold value for the case where the channel condition between the first antenna module and the terminal is stable. The first threshold value may also be determined based on a difference between azimuths of the antenna modules. For example, the first threshold value for the case where the difference between the azimuths of the first and second antenna modules is large may be greater than the first threshold value for the case where the difference between the azimuths of the first and second antenna modules is small.

According to an embodiment, the base station may determine at operation S730 whether a difference between the azimuth of the first antenna module that is determined as abnormal and a reference azimuth for the third antenna module is equal to or greater than a predetermined second threshold value. According to an embodiment, if it is determined that the difference between the azimuth of the first antenna module and the reference azimuth for the third antenna module is less than the predetermined second threshold value, the base station may assume at operation S730 that the first antenna module is electrically connected to a port for the third antenna module.

According to an embodiment, the second threshold value may be determined based on the channel condition between the first antenna module and the terminal. For example, the second threshold value for the case where the channel condition between the first antenna module and the terminal is unstable may be greater than the second threshold value for the case where the channel condition between the first antenna module and the terminal is stable. The second threshold value may also be determined based on a difference between azimuths of the antenna modules. For example, the second threshold value for the case where the difference between the azimuths of the first and third antenna modules is large may be greater than the second threshold value for the case where the difference between the azimuths of the first and third antenna modules is small. When it is determined that the difference between the azimuth of the first antenna module and the reference azimuth for the third antenna module is greater or equal than the predetermined second threshold value, the base station may judge at operation S740 that the first antenna module is abnormally operating.

According to an embodiment, if it is determined that the difference between the azimuth of the first antenna module and the reference azimuth for the third antenna module is less than the predetermined second threshold value, the base station may assume that the first antenna module is likely to be electrically connected to a port associated with the third antenna module.

According to an embodiment, the base station may determine at operation S750 whether a difference between the determined azimuth of the third antenna module and the reference azimuth for the first antenna module is equal to or less than a predetermined third threshold value. According to an embodiment, the reference azimuth for the first antenna module may be a value stored in a database of the base station, which was set as the azimuth for the first antenna module when the base station was initially installed.

According to an embodiment, if the difference between the determined azimuth of the third antenna module and the reference azimuth for the first antenna module is equal to or less than the predetermined third threshold value, the base station may determine that the current azimuth of the third antenna module is similar to the azimuth of the first antenna module that was set when the base station was initially installed.

According to an embodiment, if the difference between the determined azimuth of the third antenna module and the reference azimuth for the first antenna module is less than the predetermined third threshold value, the base station may assume that the third antenna module is electrically connected to a port that is supposed to be electrically connected to the first antenna module and the first antenna module is electrically connected to a port that is supposed to be electrically connected to the third antenna module. That is, if it is determined that the difference between the azimuth of the third antenna module and the reference azimuth for the first antenna module is less than the predetermined third threshold value, the base station may determine at operation S760 that a cable connection error has occurred.

According to an embodiment, if it is determined that the difference between the azimuth of the third antenna module and the reference azimuth for the first antenna module is greater than the third threshold value, the base station may determine at operation S770 that the first antenna module is abnormally operating. That is, the base station may determine that the current azimuth of the first antenna module is abnormal.

Figure 8:
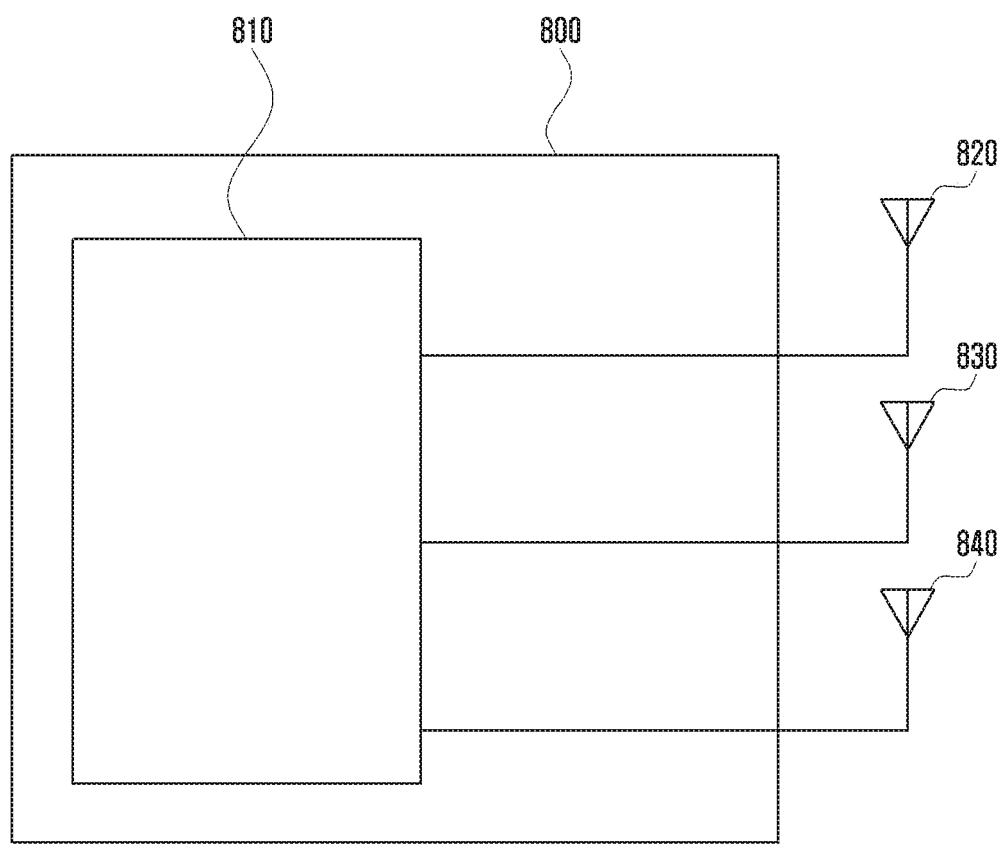
FIG. 8 is a block diagram illustrating a configuration of a base station according to an embodiment of the disclosure.

FIG. 8 is a block diagram illustrating a configuration of a base station according to an embodiment of the disclosure.

Referring to FIG. 8, according to an embodiment, the base station 800 may include a first antenna module 820 for forming a first sector, a second antenna module 830 for forming a second sector, and a third antenna module 840 for forming a third sector, the first to third sectors being included in a coverage area of the base station.

According to an embodiment, the first to third sectors are formed so as not to be overlapping with each other in the coverage area of the base station. That is, the first to third antenna modules have different azimuths.

According to an embodiment, a controller 810 may control the first antenna module 820, the second antenna module 830, and the third antenna module 840 to receive per-terminal location information and per-terminal received signal strength information from multiple terminals. According to an embodiment, the controller 810 may sample the terminals located in the first sector formed by the first antenna module 820, the terminals located in the second sector formed by the second antenna module 830, and the terminals located in the third sector formed by the third antenna module 840 based on the per-terminal location information and per-terminal received signal strength information. According to an embodiment, the controller 810 may determine the azimuth of the first antenna module 820 based on sampling information of the first sector, the azimuth of the second antenna module 830 based on sampling information of the second sector, and the azimuth of the third antenna module 840 based on sampling information of the third sector.

According to an embodiment, a method for determining an azimuth for transmission by a base station in a wireless communication system may include receiving per-terminal location information and per-terminal received signal strength information from multiple terminals, sampling terminals located in a coverage area of the base station based on the per-terminal location information and per-terminal received signal strength information, and determining the azimuth for transmission by the base station based on a result of the sampling.

According to an embodiment, the method for determining an azimuth for transmission by a base station may further include triggering each terminal to transmit the per-terminal location information and per-terminal received signal strength information with an application installed in each terminal, the triggering being performed at a predetermined interval.

According to an embodiment, the sampling may partition the coverage area of the base station into unit cells with a predetermined size based on the per-terminal location information and determine per-unit cell received signal strengths based on the per-terminal received signal strength information of the terminals located in each unit cell.

According to an embodiment, the method for determining an azimuth for transmission by a base station may further include identifying the unit cells of which the per-unit cell received signal strength is equal to or greater than a predetermined threshold value and applying a weight to the unit cells of which the per-unit cell received signal strength is equal to or greater than the predetermined threshold value.

According to an embodiment, determining the azimuth for transmission by the base station may include determining the azimuth for transmission by the base station based on an average value of per-cell azimuths.

According to an embodiment, determining the azimuth for transmission by the base station may include identifying an electric wave emission pattern predetermined for the base station and determining the azimuth for transmission by the base station based on a correlation between the electric wave emission pattern and the per-unit cell received signal strength.

According to an embodiment, the method for determining an azimuth for transmission by a base station may further include determining whether the base station is normally operating based on the determined azimuth for transmission by the base station and a reference azimuth predetermined for transmission by the base station.

According to an embodiment, determining whether the base station is normally operating may include determining that the base station is normally operating based on a difference between the determined azimuth for transmission by the base station and the reference azimuth for transmission by the base station being equal to or less than a predetermined first threshold value.

According to an embodiment, determining whether the base station is normally operating may include determining that the base station is abnormally operating based on the difference between the determined azimuth for transmission by the base station and the reference azimuth for transmission by the base station being equal to or greater than a predetermined second threshold value.

According to an embodiment, the first and second threshold values may be determined based on channel conditions between the base station and the terminals located in the coverage area of the base station or an azimuth difference between the base station a neighboring base station.

According to an embodiment, a base station of a wireless communication system may include at least one antenna module configured to transmit and receive signals to and from terminals and a controller configured to control the at least one antenna module to receive per-terminal location information and per-terminal received signal strength information from multiple terminals, sample the terminals located in coverage area of the base station based on the per-terminal location information and per-terminal received signal strength information, and determine the azimuth of the at least one antenna module based on a result of the sampling.

According to an embodiment, the controller may partition the coverage area of the base station into unit cells with a predetermined size based on the per-terminal location information and determine per-unit cell received signal strengths based on the per-terminal received signal strength information of the terminals located in each unit cell.

According to an embodiment, the controller may identify the unit cells of which the per-unit cell received signal strength is equal to or greater than a predetermined threshold value and apply a weight to the unit cells of which the per-unit cell received signal strength is equal to or greater than the predetermined threshold value.

According to an embodiment, the controller may determine the azimuth of the at least one antenna module based on an average value of per-cell azimuths.

According to an embodiment, the controller may identify an electric wave emission pattern predetermined for the base station and determine the azimuth of the at least one antenna module based on a correlation between the electric wave emission pattern and the per-unit cell received signal strength.

According to an embodiment, the controller may determine whether the at least one antenna module is normally operating based on the determined azimuth of the at least one antenna module and a predetermined reference azimuth of the at least one antenna module.

According to an embodiment, the controller may determine that the at least one antenna module is normally operating based on a difference between the determined azimuth of the at least one antenna module and the predetermined reference azimuth of the at least one antenna module being equal to or less than a predetermined first threshold value.

According to an embodiment, the controller may determine that the at least one antenna module is abnormally operating based on a difference between the determined azimuth of the at least one antenna module and the predetermined reference azimuth of the at least one antenna module being equal to or greater than a predetermined second threshold value.

According to an embodiment, the at least one antenna module includes a first antenna module and a second antenna module that are different in coverage, and the controller may determine that a first connection between the controller and the first antenna module and a second connection between the controller and the second antenna module are reversely established based on a difference between the determined azimuth of the first antenna module and a reference azimuth of the second antenna module being equal to or less than a predetermined third threshold value.

According to an embodiment, the third threshold value may be determined based on channel conditions between the base station and the terminals located in a coverage area of the base station or an azimuth difference between the base station and a neighboring base station.

As described above, a disclosed embodiment is advantageous in terms of determining an azimuth of an antenna module of a base station without any separate additional devices. A disclosed embodiment is also advantageous in terms of facilitating judgment on whether a base station is normally operating based on the determined azimuth of the antenna module and finding out, if the base station is abnormally operating, the cause of the abnormal operation.

While the disclosure has been shown and described with reference to various embodiments thereof, it will be understood by those skilled in the art that various changes in form and details may be made therein without departing from the spirit and scope of the disclosure as defined by the appended claims and their equivalents. If necessary, the embodiments may be combined in whole or in part. For example, the disclosed embodiments may be combined, in part or whole, with each other to form an embodiment for the operations of a base station and a terminal.

What is claimed is:

1. A method by a base station in a wireless communication system, the method comprising:
receiving terminal location information and terminal received signal strength information from a plurality of terminals;
based on the terminal location information, determining a plurality of unit areas partitioned from coverage of the base station, the plurality of unit areas having a predetermined size;
determining strength level information for each of the plurality of the unit areas, based on the terminal received signal strength information of the terminals located in each of the plurality of the unit areas;
identifying a correlation between a predetermined electric wave emission pattern for at least one antenna and the strength level information, by rotating the predetermined electric wave emission pattern;
determining at least one azimuth, each of the at least one azimuth corresponding to each of the at least one antenna, based on a result of the identification of the correlation;
identifying whether a difference between a first azimuth from the determined at least one azimuth and a predetermined first reference azimuth is larger than a predetermined first threshold value; and
determining the base station is abnormally operating, in case that the difference between the first azimuth and the predetermined first reference azimuth is larger than the predetermined first threshold value.

2. The method of claim 1, further comprising triggering each terminal to transmit the terminal location information based on an application installed in each terminal, the triggering being performed at a predetermined time interval.

3. The method of claim 1, further comprising:
identifying at least one unit area of which a received signal strength is equal to or greater than a predetermined threshold value; and
applying a weight to the at least one unit area of which the received signal strength is equal to or greater than the predetermined threshold value.

4. The method of claim 1, wherein the determination of the at least one azimuth is based on an average value of the strength level information for each of the plurality of the unit areas.

5. The method of claim 1, further comprising:
identifying whether a difference between the first azimuth and a predetermined second reference azimuth is equal to or larger than a predetermined second threshold value, in case that the difference between the first azimuth and the predetermined first reference azimuth is larger than the predetermined first threshold value; and
determining the base station is abnormally operating due to a cause except for a cable connection error, in case that the difference between the first azimuth and the predetermined second reference azimuth is equal to or larger than the predetermined second threshold value.

6. The method of claim 5, further comprising:
identifying whether a difference between a second azimuth from the determined at least one azimuth and the predetermined first reference azimuth is equal to or smaller than a predetermined third threshold value, in case that the difference between the first azimuth and the predetermined second reference azimuth is smaller than the predetermined second threshold value; and
determining the base station is abnormally operating due to the cable connection error, in case that the difference between the second azimuth and the predetermined first reference azimuth is equal to or smaller than the predetermined third threshold value.

7. The method of claim 6, further comprising:
determining the base station is abnormally operating due to a cause except for the cable connection error, in case that the difference between the second azimuth and the predetermined first reference azimuth is larger than the predetermined third threshold value.

8. The method of claim 6, wherein at least one threshold value among the first threshold value, the second threshold value, and the third threshold value is determined based on channel conditions between the base station and the terminals located in the coverage of the base station or a difference in azimuth between each corresponding antenna.

9. A base station of a wireless communication system, the base station comprising:
at least one antenna configured to transmit and receive signals; and
at least one processor configured to:
control the at least one antenna to receive terminal location information and terminal received signal strength information from a plurality of terminals, based on the terminal location information, determine a plurality of unit areas partitioned from coverage of the base station, the plurality of unit areas having a predetermined size, determine strength level information for each of the plurality of the unit areas, based on the terminal received signal strength information of the terminals located in each of the plurality of the unit areas, identify a correlation between a predetermined electric wave emission pattern for at least one antenna and the strength level information, by rotating the predetermined electric wave emission pattern, determine at least one azimuth, each of the at least one azimuth corresponding to each of the at least one antenna, based on a result of the identification of the correlation, identify whether a difference between a first azimuth from the determined at least one azimuth and a predetermined first reference azimuth is larger than a predetermined first threshold value, and determine the base station is abnormally operating, in case that the difference between the first azimuth and the predetermined first reference azimuth is larger than the predetermined first threshold value.

10. The base station of claim 9, wherein the at least one processor is further configured to:
identify at least one unit area of which a received signal strength is equal to or greater than a predetermined threshold value, and
apply a weight to the at least one unit area of which the received signal strength is equal to or greater than the predetermined threshold value.

11. The base station of claim 9, wherein the determination of the at least one azimuth is based on an average value of the strength level information for each of the plurality of the unit areas.

12. The base station of claim 9, wherein the at least one processor is further configured to:
identify whether a difference between the first azimuth and a predetermined second reference azimuth is equal to or larger than a predetermined second threshold value, in case that the difference between the first azimuth and the predetermined first reference azimuth is larger than the predetermined first threshold value, and
determine the base station is abnormally operating due to a cause except for a cable connection error, in case that the difference between the first azimuth and the predetermined second reference azimuth is equal to or larger than the predetermined second threshold value.

13. The base station of claim 12, wherein the at least one processor is further configured to:
identify whether a difference between a second azimuth from the determined at least one azimuth and the predetermined first reference azimuth is equal to or smaller than a predetermined third threshold value, in case that the difference between the first azimuth and the predetermined second reference azimuth is smaller than the predetermined second threshold value, and
determine the base station is abnormally operating due to the cable connection error, in case that the difference between the second azimuth and the predetermined first reference azimuth is equal to or smaller than the predetermined third threshold value.

14. The base station of claim 13, wherein the at least one processor is further configured to:
determine the base station is abnormally operating due to a cause except for the cable connection error, in case that the difference between the second azimuth and the predetermined first reference azimuth is larger than the predetermined third threshold value.

15. The base station of claim 14, wherein at least one threshold value among the first threshold value, the second threshold value, and the third threshold value is determined based on channel conditions between the base station and the terminals located in the coverage area of the base station or a difference in azimuth between each corresponding antenna.

16. The base station of claim 9, the at least one processor is further configured to trigger each terminal to transmit the terminal location information based on an application installed in each terminal, being performed at a predetermined time interval.

* * * * *